United States Patent Office 3,577,410
Patented May 4, 1971

3,577,410
13β-ALKYL-17-HYDROXYGONA-4,14-DIEN-3-ONES
Daniel M. Teller, King of Prussia, George H. Douglas, Paoli, and Herchel Smith, Wayne, Pa., assignors to American Home Products Corporation, New York, N.Y.
No Drawing. Filed July 30, 1968, Ser. No. 749,922
Int. Cl. C07c *173/00*
U.S. Cl. 260—239.55                   25 Claims

ABSTRACT OF THE DISCLOSURE

New steroids of the 13β-alkyl-17β-hydroxygona-4,14-dien-3-one series optionally substituted at C-7 and C-17 by α-methyl (I) are provided by either (a) isomerizing a corresponding 17-hydroxy-13β-alkylgona-5(10),14-dien-3-one (II) or (b) reacting with a methyl Grignard reagent a corresponding 17-hydroxy-13β-alkylgona-4,6,14-trien-3-one (III). Means are provided to prepare the intermediate compounds II and III. Compounds I and Ia are androgenically-active in warm-blooded lower animals.

---

This invention relates to steroid compounds with valuable hormonal properties and to intermediates and processes for their preparation. More particularly it is concerned with steroids of the 13β-alkyl-17-hydroxygona-4,14-dien-3-one series, which have potent androgenic activity in standard pharmacological tests in warm-blooded lower animals, such as rats.

DESCRIPTION OF THE INVENTION

The compounds contemplated by this invention are those of Formula I:

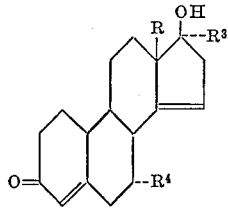

I wherein
R is (lower)alkyl; and
$R^3$ and $R^4$ are hydrogen or methyl.

Illustrative and important embodiments of this invention are:

The compound of Formula I which is 13-ethyl-17β-hydroxy-17α-methylgona-4,14-dien-3-one; and
The compound of Formula I which is 13-ethyl-17β-hydroxygona-4,14-dien-3-one.

Also valuable as specific embodiments are compounds of Formula Ia:

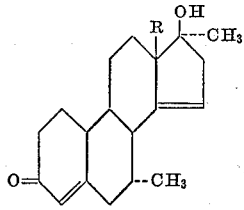

Ia wherein R is (lower)alkyl.

Special mention is made of several other particularly valuable embodiments of this invention. These are, respectively:

17β-hydroxy-7α,17α-dimethylestra-4,14-dien-3-one, a compound of Formula Ia wherein R is methyl; and 13β-ethyl-17β-hydroxy-7α,17α-dimethylgona-4,14-dien-3-one, a compound of Formula Ia wherein R is ethyl.

When used herein and in the appended claims, the term "alkyl" contemplates hydrocarbon alkyl radicals, straight chain and branched, of from about 1 to about 24 carbon atoms. The term "(lower)alkyl" contemplates alkyl radicals of from about 1 to about 6 carbon atoms, illustrative members of which are methyl, ethyl, n-propyl, i-propyl, n-butyl, t-butyl, n-pentyl, n-hexyl and the like. R is preferably methyl or ethyl; especially preferred is ethyl.

The compounds of Formula I can be made in a number of ways. One especially convenient procedure comprises either:

(a) Isomerizing, as by treatment with a base or a strong acid, a 17-hydroxy-13β-alkylgona-5(10),14-dien-3- one of Formula II:

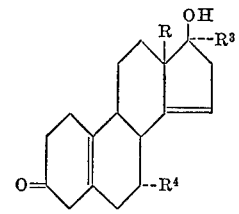

II wherein $R^3$ and $R^4$ are hydrogen or methyl and wherein R is as hereinabove defined, until formation of a compound of Formula I is substantially complete; or for $R^4$ to be methyl, (b) Reacting with a methyl Grignard reagent, e.g., methyl magnesium bromide, in an inert solvent, e.g., tetrahydrofuran, preferably in the presence of a promoter, e.g., cuprous chloride, a 17-hydroxy-13β-alkylgona-4,6,14-trien-3-one of Formula III:

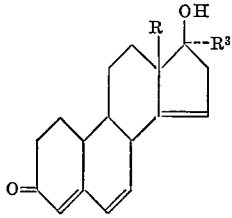

III wherein $R^3$ is hydrogen or methyl and wherein R is as hereinabove defined, until formation of a Grignard complex of a compound of Formula I is substantially complete, decomposing said complex as by treatment with aqueous mineral acid; and recovering said compound of Formula I. The valuable intermediates of Formulae II and III also are contemplated by this invention.

The conditions required to carry out the isomerization procedure of step (a) are not particularly critical. The isomerization can be carried out under basic conditions, as with aqueous alcoholic sodium or potassium hydroxide at room temperature, i.e., about 20–25° C., or with sodium alkoxide in an alcohol at 40–80° C., preferably 60° C. Vigorous acid conditions, such as heating in methanol with concentrated hydrochloric acid, can also be used. In one manner of proceeding, the steroid of Formula II is suspended in about 75 parts by volume of methanol, which contains about ⅓ part by weight of potassium hydroxide per part by weight of steroid. The mixture is stirred under nitrogen and the reaction is substantially complete in about 5 minutes at about 22° C. The product of Formula I is recovered by any conventional means. One useful method comprises pouring the reaction mixture into saturated aqueous sodium bicarbonate, extracting with either, washing the ether extract with water, drying it with anhydrous sodium sulfate, then evaporating the ether to dryness, leaving the product of Formula I as a residue. It may, if desired, be purified by chromatography on neutral alumina using benzene/hexane as eluent and gradually increasing the proportion of benzene. The product then may be recrystallized from a suitable solvent, such as ether.

The conditions required to carry out the reaction with the Grignard reagent, step (b), are consistent with standard techniques. In one manner of proceeding, the Grignard reagent, e.g., methyl magnesium bromide (conveniently a 3 M solution in ether) is mixed with about 0.02 part by weight of cuprous chloride per part by volume of Grignard reagent, in about 5 volumes of tetrahydrofuran, based on volume of Grignard reagent. To this mixture, under nitrogen and at about 0° C., there is added during about 15 minutes with vigorous stirring, about one-eighth part by weight of the steroid of Formula III based on volume of the Grignard solution in ether, dissolved in 20 parts by volume of tetrahydrofuran, per part by weight of steroid of Formula III. The reaction mixture is allowed to warm to about 22° C., and stirring is continued for an additional 30 minutes during which time the formation of a Grignard complex of a compound of Formula I is substantially complete. The said complex is decomposed in any conventional manner. One useful means comprises use of ice, brine and hydrochloric acid, wherein decomposition is almost instantaneous. The product of Formula I can be recovered by nay standard method. For example, the mixture can be extracted with ether, the extracts can be washed with aqueous sodium bicarbonate, brine and then dried over anhydrous sodium sulfate. Evaporation of the solvent leaves the product of Formula I as a residue. The product can, if desired, be purified by chromatography and recrystallized as described above.

Compounds of Formula I can also be made by reacting with a strong acid, such as hydrochloric acid in an inert solvent, such as an aqueous alcohol, e.g., methanol containing a small amount of water, a 13-$\beta$-alkyl-17$\beta$-hydroxy-3-(lower)alkoxygona-2,5(10),14-rtiene of Formula IIIa

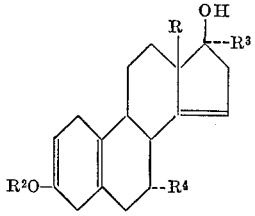

IIIa wherein R and $R^2$ are (lower)alkyl and $R^3$ and $R^4$ are hydrogen or (lower)alkyl, until formation of a compound of Formula I is complete and recovering said compound. The conditions will be exemplified in detail hereinafter. Compounds of Formula IIIa are contemplated by this invention.

As is mentioned hereinabove, the compounds of Formula I of this invention are potent androgens. This renders them valuable in the treatment of conditions in valuable domestic animals, such as cattle, sheep and dogs and in laboratory animals, such as mice, rats and the like, responsive to treatment with androgenic agents. Such conditions, indicative of primary or secondary androgen deficiency are impotence, testicular deficiency, suppression of lactation and the like. The androgenic activity is demonstrated in standard pharmacological tests, such as the Hershberger test, described by L. G. Hereshberger, E. G. Shipley and R. K. Meyer, Proc. Soc. Exp. Biol. (N.Y.) 83, 175 (1953) and in R. A. Edgren, Acta Endocrinologica, Suppl. 87, 3–21, comprising administering the compound in solution in 0.1 ml. of corn oil subcutaneously daily to castrated male rats for 7 days, then measuring the weights of ventral prostates, seminal vesicles and levator ani muscles. Active androgens produce increases in weight of prostates and seminal vesicles. Relative potencies, with testosterone propionate employed as a standard, are calculated by means described by Edgren. When administered for the pharmacological purposes indicated above, compounds of Formula I are given by routes, and in formulations and in dosage regimens generally useful for androgenic agents like testosterone and 17-methyltestosterone [Merck Index, Seventh edition, pages 1018 and 684, respectively, (1960)].

Starting materials for the preparation of the instant compounds by step (a), i.e., the 17-hydroxy-13$\beta$-alkylgona-5(10),14-dien-3-ones of Formula II can be prepared from $\Delta^6$-dehydrotestosterone, $\Delta^6$-dehydro-19-nortestosterone and $\Delta^6$-dehydro-18-homo-19-nortestosterone, which in turn are prepared by chloranil dehydrogenation of the respective $\Delta^4$-dihydro analogs shown, for example, in the Merck Index, Seventh edition, p. 1018 (1960) and in H. Smith, G. A. Hughes, G. H. Douglas, G. R. Wendt, G. C. Buzby, Jr., R. A. Edgren, J. Fisher, T. Foell, B. Gadsby, D. Hartley, D. Herbst, A. B. A. Jansen, K. Ledig, B. J. McLoughlin, J. McMenamin, T. W. Pattison, P. C. Phillips, R. Rees, J. Siddal, J. Suida, L. L. Smith, J. Tokolics, and D. H. P. Watson, J. Chem. Soc., 1964, 4472–4492.

The procedure using $\Delta^6$-dehydrotestosterone (IV) is illustrated in part in the following pathway:

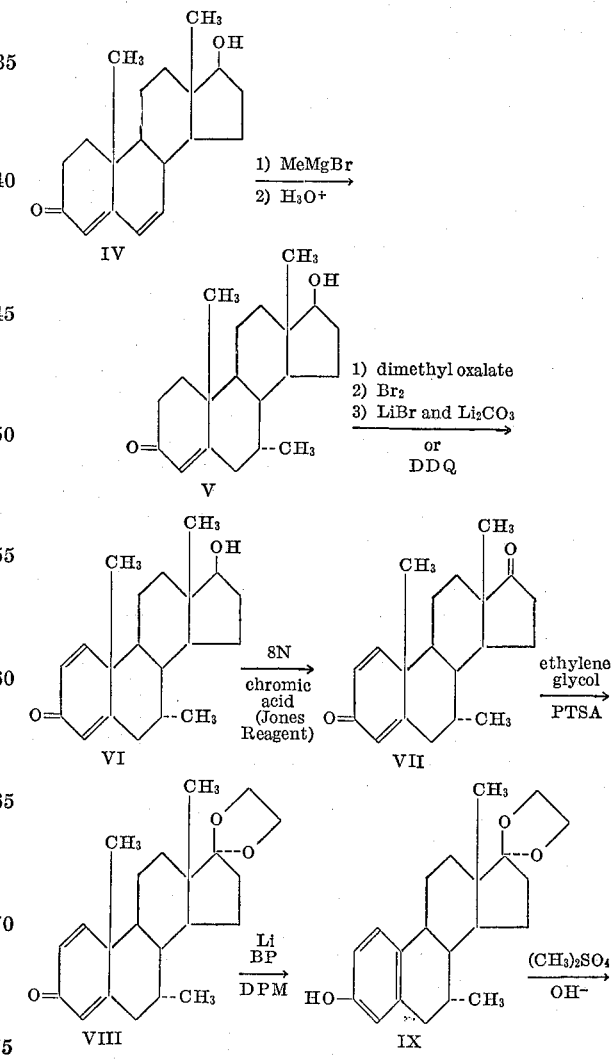

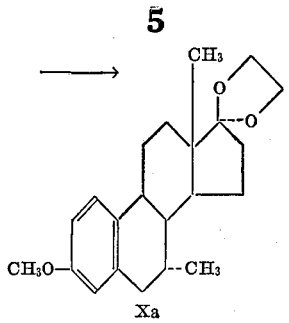

Xa wherein "DDQ" is 2,3 - dichloro-5,6-dicyano-1,4-benzoquinone, "PTSA" is p-toluene sulfonic acid, "BP" is biphenyl and "DPM" is diphenylmethane. These procedures to prepare the 3-methoxy-7α-methylestra-1,3,5(10)-trien-17-one, cyclic ethylene ketal, will be described in detail hereinafter. The corresponding 18-homo-3-methoxy-estra-1,3,5(10)-trien-17-one, cyclic ethylene ketals of Formula Xb

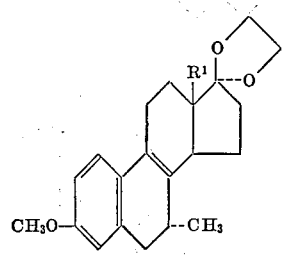

Xb wherein $R^1$ is alkyl of from 2 to 6 carbon atoms, are prepared from the $\Delta_6$-19 nor compounds above by 7α-methylation, chromic acid oxidation, ketalization, A-ring aromatization and etherification (with a suitable reagent, such as a di(lower)alkyl sulfate) in the outlined procedures, the steps of introducing delta-1-unsaturation and elimination of the 10-methyl group being unnecessary in this series. These pathways provide 3-(lower)alkoxy-13β-alkyl-7α-methylgona-1,3,5(10)-trien-17-one, cyclic ketals of general Formula X which are converted by the following pathway to starting materials of Formula II:

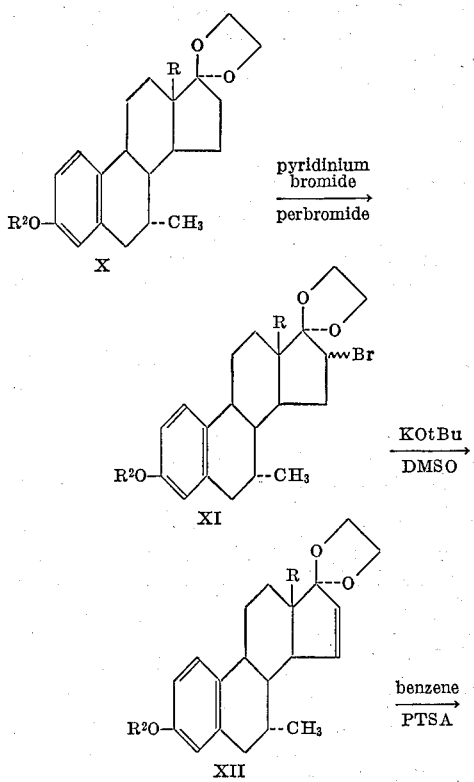

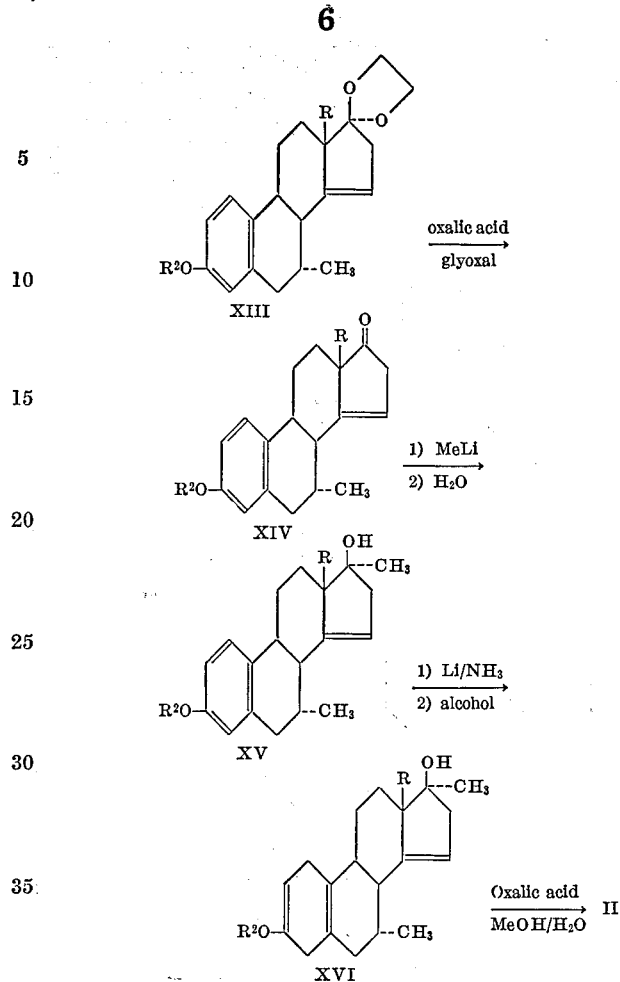

wherein R and $R^2$ are (lower)alkyl, "PTSA" is as above defined and "DMSO" is dimethylsulfoxide. The valuable intermediates of Formulae XI to XVI are contemplated by this invention. To prepare them the 3-(lower)alkoxy-13β-alkyl - 7α - methylgona-1,3,5(10)-trien-17-one, cyclic ethylene ketal X is added to pyridinium bromide perbromide in tetrahydrofuran at moderate temperature and after about 2.5 hours, formation of the corresponding 16ξ-bromo-3-(lower)alkoxy - 13β - alkyl-7α-methylgona-1,3,5(10)-trien-17-one, cyclic ethylene ketal XI is substantially complete. Compound XI is dehydrobrominated in dimethylsulfoxide solution with potassium t-butoxide to provide the corresponding 3-(lower)alkoxy-13β-alkyl-7α-methylgona - 1,3,5(10),15-tetraen-17-one, cyclic ethylene ketal XII. Compound XII is isomerized with an acid, such as p-toluenesulfonic acid monohydrate in benzene to provide the corresponding 3-(lower)alkoxy-13β-alkyl-7α-methylgona - 1,3,5(10),14-tetraen-17-one, cyclic ethylene ketal XIII. Compound XIII is deketalized by reaction with oxalic acid and glyoxal to provide the corresponding 3-(lower)alkoxy - 13β - alkyl-7α-methylgona-1,3,5(10)-14-tetraen-17-one XIV. Compound XIV is reacted with a methylating agent, such as methyl lithium in ether to provide the corresponding 3-(lower)alkoxy-13β-alkyl-7α,17α-dimethylgona-1,3,5(10),14-tetraen-17β-ol XV. Compound XV is reacted first with lithium in ammonia in the presence of 1-methoxy-2-propanol, then with ammonium chloride and water to provide the corresponding 3-(lower)alkoxy-13β-alkyl-7α,17α - dimethylgona - 2,5(10), trien-17β-ol XVI. Compound XVI is added to a solution of oxalic acid in methanol and water and there is obtained the required 17β - hydroxy - 13β - alkyl-7α,17α-dimethylgona-5(10),14-dien-3-one of Formula II used as the starting material. These procedures will be illustrated in detail hereinafter.

Starting materials for the preparation of the instant compounds by step (b), i.e., the 17-hydroxy-13β-alkyl-17α-methylgona-4,6,14-trien-3-ones of Formula III can be prepared from the corresponding 3-(lower)alkoxy-13β-alkylgona-1,3,5(10)-trienes, XVII, provided, for example, in the procedures outlined in the above-identified H. Smith et al. paper. A useful pathway is illustrated as follows:

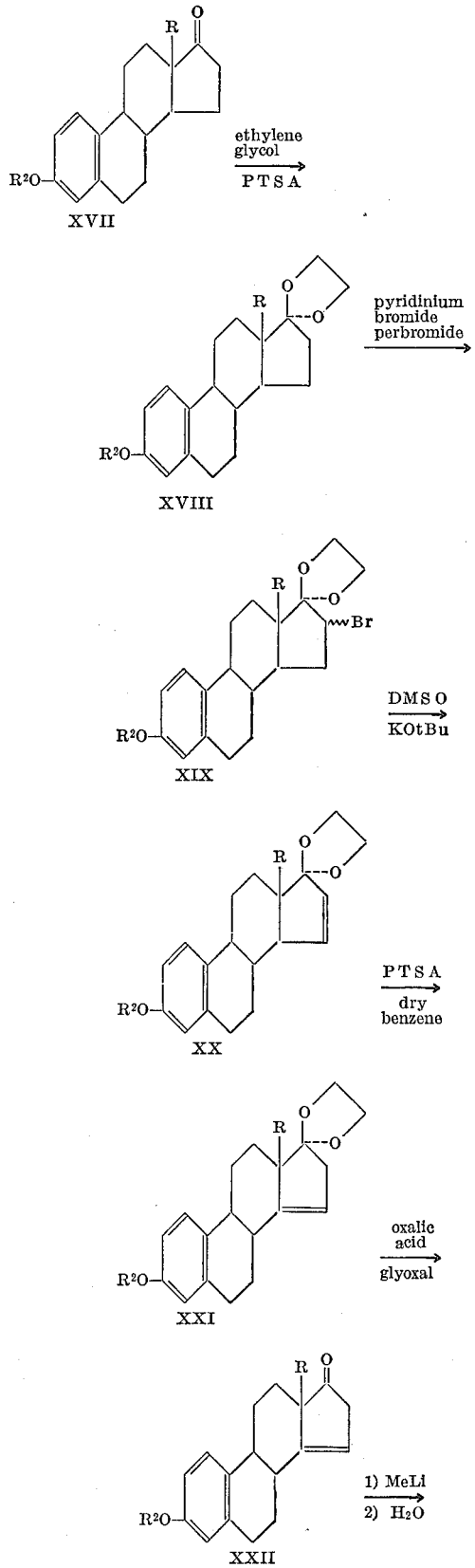

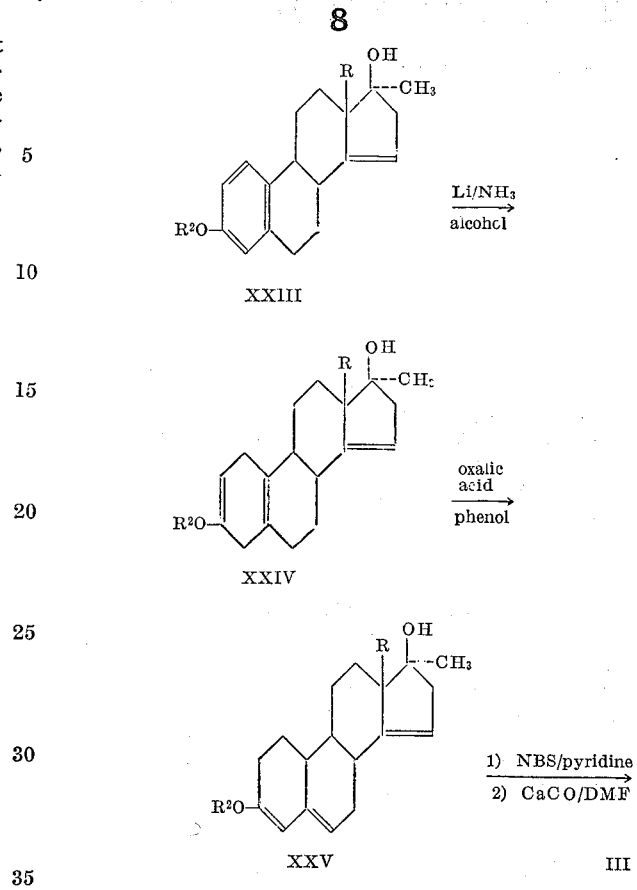

wherein R and R² are (lower)alkyl, "DMSO" and "PTSA" are as hereinabove defined, "NBS" is N-bromosuccinimide and "DMF" is dimethylformamide. The 3-(lower)alkoxy-13β-alkylgona-1,3,5(10)-trien-17-one XVII is refluxed in toluene solution with ethylene glycol and p-toluenesulfonic acid to provide the corresponding 3-(lower)alkoxy-13β-alkylgona-1,3,5(10)-trien-17-one, cyclic ethylene ketal XVIII. Compound XVIII is reacted in tetrahydrofuran solution with pyridinium bromide perbromide to provide the corresponding 16ξ-bromo-3-(lower)alkoxy-13β-alkylgona-1,3,5(10)-trien-17-one, cyclic ethylene ketal XIX. Compound XIX is dehydrobrominated in dimethylsulfoxide with potassium t-butoxide to provide the corresponding 3-(lower)alkoxy-13β-alkylgona-1,3,5(10),15-tetraen-17-one, cyclic ethylene ketal XX. Compound XX is isomerized with p-toluenesulfonic acid in dry benzene to provide the corresponding 3-(lower)alkoxy-13β-alkylgona-1,3,5(10),14-tetraen-17-one, cyclic ethylene ketal XXI. Compound XXI is deketalized with oxalic acid and glyoxal to provide the corresponding 3-(lower)alkoxy-13β-alkylgona-1,3,5(10),14-tetraen-17-one XXII. Compound XXII is reacted with a methylating agent, e.g., methyl lithium in ether, then with water to provide the corresponding 3-(lower)alkoxy-13β-alkyl-17α-methylgona-1,3,5(10),14-tetraen-17β-ol XXIII. Compound XXIII is reduced with lithium in liquid ammonia in the presence of 1-methoxy-2-propanol to provide the corresponding 3-(lower)alkoxy-13β-alkyl-17α-methylgona-2,5(10),14-trien-17β-ol XXIV. Compound XXIV is rearranged with oxalic acid dihydrate in phenol to provide the corresponding 3-(lower)alkoxy-13β-alkyl-17α-methylgona-3,5,14-trien-17β-ol XXV. Compound XXV is treated first with pyridine and N-bromosuccinimide, then with calcium carbonate in dimethylformamide to provide the corresponding 13β-alkyl-17β-hydroxy-17α-methylgona-4,6,14-trien-3-one of Formula III. These procedures will be exemplified in detail hereinafter.

Useful general pathways to prepare a compounds of Formula I can be derived from those above. For example:

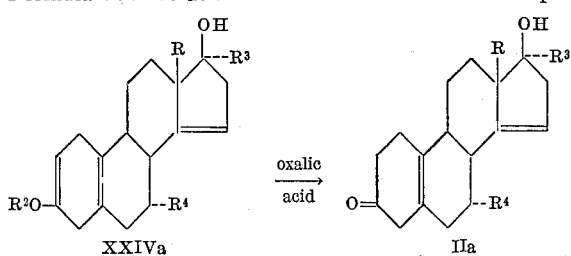

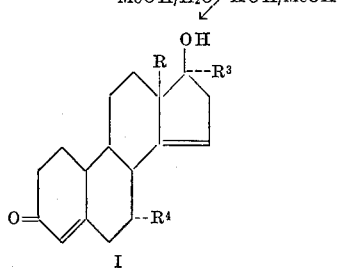

wherein R and R² are (lower)alkyl and R³ and R⁴ are hydrogen or methyl;

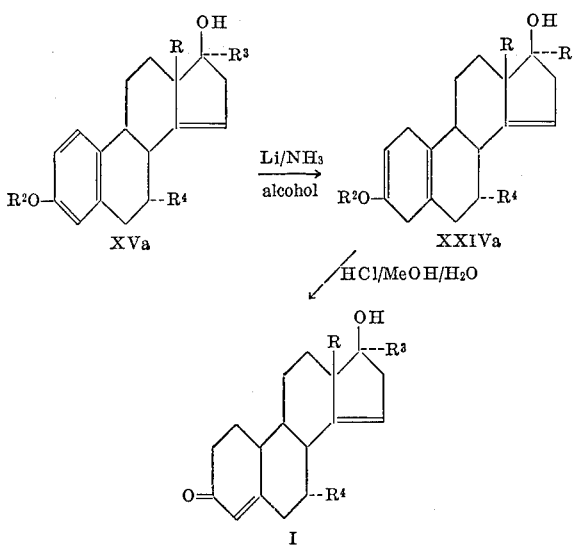

wherein R and R² are (lower)alkyl and R³ and R⁴ are hydrogen or methyl; and

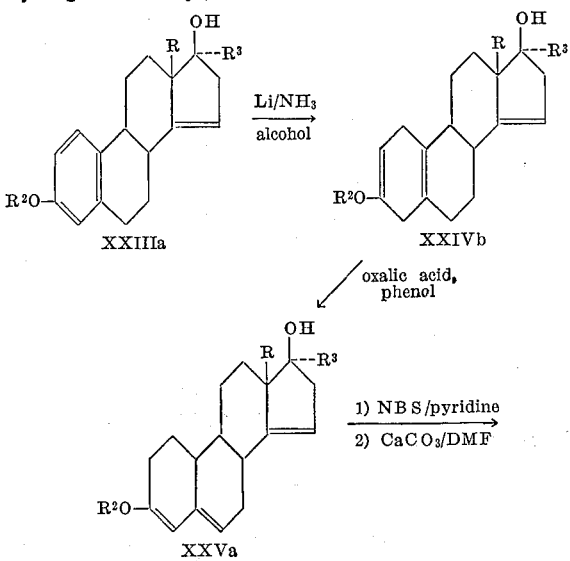

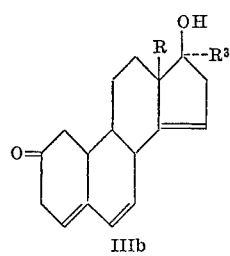

wherein R and R² are (lower)alkyl, R³ is hydrogen or methyl and "NBS" and "DMF" are as above defined. The valuable intermediates of Formulae IIa, IIIb, XVa and XXIVa also are contemplated by this invention.

In the product of a total synthesis, e.g., one such as described in H. Smith et al., J. Chem. Soc. (1964), mentioned hereinabove, which has not included a suitable resolution stage the compounds prepared by the invention will be present as racemates. Using a convention approved by Fieser and Fieser, "Steroids" p. 336 (1959), the compounds designated as a d-forms are the enantiomers corresponding in configuration at C–13 to that of the natural hormone estrone. The corresponding enantiomorphs are consequently designated the l-forms and the racemates the dl-forms. Racemates will be depicted by structural formulas which show only the enantiomorphs of the d-configuration.

DESCRIPTION OF THE PREFERRED EMBODIMENTS

The following examples are illustrative of the compounds, intermediates and methods of the instant invention. They are merely illustrative and are not to be construed to limit the scope thereof in any manner whatsoever.

EXAMPLE 1 d-3-methoxy-7α-methylestra-1,3,5(10)-trien-17-one cyclic ethylene ketal (a) d-17β-hydroxy-7α-methylandrost-4-en-3-one: To a mixture of methyl magnesium bromide (3 M in ether, 16.0 ml.) and freshly prepared cuprous chloride (0.3 g.) in tetrahydrofuran (80 ml.) under nitrogen at 0° C. is added over 15 minutes with vigorous stirring a solution of 6-dehydrotestosterone (2.0 g.) in tetrahydrofuran (40 ml.). Stirring is continued at room temperature for another 30 minutes. The mixture is poured into a mixture if ice-brine-hydrochloric acid. The product is then extracted with ether, the extracts washed with saturated aqueous sodium bicarbonate, water, dried over anhydrous sodium sulfate and stripped in vacuo. The solid residue is recrystallized twice from acetonitrile giving 1.26 g. of yellow colored product; M.P. 200–206° C.;

$\lambda_{max.}^{EtOH}$ 243 m$\mu$ ($\epsilon$ 15,900)

(b) d-17β-hydroxy-7α-methylandrosta-1,4-dien-3-one: To a solution of dimethyl oxalate (0.90 g.) in dry benzene (10.0 ml.) is added sodium methoxide (0.42 g.). The mixture is stirred 15 minutes at room temperature, cooled to 0° C. and d-7α-methyltestosterone (1.0 g.) is added. The mixture is stirred under nitrogen for 3 hours at 0° C. and then for 18 hours under nitrogen at about 23° C. Benzene is added and the mixture extracted with 5% aqueous potassium hydroxide. The aqueous fractions are acidified with dilute hydrochloric acid, extracted with ether, the extracts washed with water, dried over anhydrous sodium sulfate and stripped in vacuo <40° C. A 0.50 g. portion of the resulting amorphous methoxalyl derivative (1.30 g.) is dissolved in methanol (15.0 ml.) and potassium acetate (2.6 g.) is added. The mixture is cooled to —5° C. and a solution of bromine (1.40 ml. of 1 M Br₂/CCl₄ solution) in carbon tetrachloride is added dropwise over 15 minutes. The mixture is then stirred at about 23° C. for 3 hours. Water is added and the mixture is extracted with ether. The ether extracts are washed with dilute aqueous sodium bicarbonate, water, dried over anhydrous sodium sulfate and stripped in vacuo at 30° C. giving 0.47 g. of light yellow product which gives a positive Beilstein test. The crude product is dissolved in dimethylformamide (15 ml.), and lithium bromide (0.6 g.), and lithium carbonate (0.6 g.) are added. The mixture is heated at 120° C. under nitrogen for 10 hours. After cooling to about 23° C. the solids are filtered off, washed with ether and the combined filtrate and washings are washed with water, dried over anhydrous sodium sulfate and stripped in vacuo giving 0.38 g. of the title product as a yellow glass which gives a negative Beilstein test. Crystallization from aqueous methanol affords 0.25 g. of the title compound as a yellow solid; M.P. 105–110° C.;

$\lambda_{max.}^{KBr}$ 6.05, 6.19, 6.27µ

(c) *d*-7α-methylandrosta-1,4-diene-3,17-dione: To a solution of *d*-17β - hydroxy-7α-methylandrosta-1,4-dien-3-one (1.0 g.) in acetone (40 ml.) at room temperature is added 8 N chromic acid (Jones reagent, 8 N 1.0 ml.). After 15 minutes, excess isopropanol is added. The mixture is diluted with ether, washed with saturated aqueous sodium bicarbonate, water, brine, dried over anhydrous sodium sulfate and stripped in vacuo. The residue is recrystallized from acetone-hexane to give the title compound, M.P., 163–165° C.

(d) *d*-7α - methylandrosta-1,4-diene-3,17-dione, 17-cyclic ethylene ketal: A solution of the product of step (c) (2.50 g.), ethylene glycol (25 ml.), and p-toluenesulfonic acid (100 mg.) in benzene (300 ml.) is refluxed for 2 hours using a Dean-Stark water separator. The mixture is cooled, washed with saturated aqueous sodium bicarbonate, water, dried over anhydrous sodium sulfate and stripped in vacuo. The solid residue is recrystallized from acetone-hexane giving 2.04 g. of yellow colored product; M.P. 164–166° C., $\lambda_{max}^{KBr}$ 6.04, 6.17, 6.26 and no carbonyl absorption (e) *d*-7α-methylestra-1,3,5(10)trien-3-ol-17-one, cyclic ethylene ketal: To a solution of biphenyl (1.8 g.) and diphenylmethane (0.90 g.) in tetrahydrofuran (45 ml., distilled from lithium aluminum hydride) is added lithium ribbon (0.10 g., cut in small pieces) under nitrogen. The solution is refluxed and after 5 minutes under reflux becomes deep blue-green in color. A solution of the product of step (d) (1.8 g.) in tetrahydrofuran (27 ml.) is added dropwise at reflux over 10 minutes. Refluxing is continued under nitrogen for another 50 minutes. The mixture is cooled to 0° C. and methanol and water added successively. Acetic acid is added to pH 6, and the mixture is extracted with ether, washed with saturated aqueous sodium bicarbonate, water, dried over anhydrous sodium sulfate and stripped in vacuo. The resulting glass is triturated with hexane giving 1.10 g. of slightly yellow colored product, M.P. 140–145° C.;

$\lambda_{max.}^{KBr}$ 3.08, 6.20, 6.36, 6.70 and no carbonyl absorption (f) *d*-3-methoxy - 7α - methylestra-1,3,5(10)-trien-17-one, cyclic ethylene ketal: To a solution of *d*-7α-methylestra-1,3,5(10)-trien-3-ol, 17-one, cyclic ethylene acetal (1.0 g.) in refluxing ethanol (50 ml.) is added dropwise 10.0 ml. of 60% sodium hydroxide and 7.0 ml. of dimethyl sulfate. The additions are repeated two more times at 15 minute intervals. To the cooled mixture water is added and the resulting precipitate is filtered off giving the title compound.

EXAMPLE 2

*d*-17β-hydroxy-7α,17α-dimethylestra-5(10),14-dien-3-one (a) *d*-16ξ-bromo - 3 - methoxy - 7α - methylestra-1,3,5(10)-trien-17-one, cyclic ethylene ketal: To a solution of *d*-3-methoxy-7α-methylestra-1,3,5(10)-trien-17-one, cyclic ethylene acetal (1.0 g.) in tetrahydrofuran (100 ml.) is added all at once pyridinium bromide perbromide (1.2 g.) at room temperature. After stirring at room temperature for 2½ hours the mixture is diluted with ether, washed with saturated aqueous sodium bicarbonate, water, brine, dried over anhydrous sodium sulfate and stripped in vacuo. The residue is recrystallized from an appropriate solvent to give the title compound.

(b) *d*-3-methoxy-7α-methylestra - 1,3,5(10),15-tetraen-17-one, cyclic ethylene ketal: A solution of *d*-16ξ-bromo-3-methoxy-7α-methylestra - 1,3,5(10)-trien-17-one, cyclic ethylene acetal (1.0 g.) in dimethylsulfoxide (20 ml.), containing potassium t-butoxide (2.24 g.) is stirred at room temperature for 2½ hours. The mixture is poured into ice water, extracted with ether, the extracts washed with saturated sodium bicarbonate, water, brine, dried over anhydrous sodium sulfate and stripped in vacuo. The residue is chromatographed on Grade III Woelm neutral alumina giving the title compound.

(c) *d*-3-methoxy-7α-methylestra - 1,3,5(10),14-tetraen-17-one, cyclic ethylene ketal: A solution of p-toluenesulfonic acid (12 mg.) in benzene (25 ml.) is partially distilled to remove traces of water (ca. 5 ml. of distillate). The solution is cooled to room temperature and the product of step (b) (0.20 g.) is added. After stirring 45 minutes at room temperature the solution is poured into saturated aqueous sodium bicarbonate. Ether is added, the organic layer separated, washed with water, dried over anhydrous sodium sulfate and stripped in vacuo yielding the product as a residue.

(d) *d*-3-methoxy-7α-methylestra-1,3,5(10),14-tetraene-17-one: To a solution of the product of step (c) (4.70 g.) in acetone (150 ml.), is added oxalic acid dihydrate (0.18 g.) and glyoxal (40% in water, 110 ml.). The mixture is stirred at about 23° C. for 18 hours, diluted with water, washed with saturated aqueous sodium bicarbonate, water, dried over anhydrous sulfate and stripped in vacuo to leave the title compound as a residue.

(e) *d* - 3 - methoxy-7α,17α-dimethylestra-1,3,5(10),14-tetraen-17β-ol: To a mixture of methyl lithium (10 ml., 1.62 M) in ether (100 ml.) at room temperature under nitrogen is added the product of step (d) (0.50 g.) in ether (50 ml.) over 30 minutes with stirring. After stirring another 60 minutes at room temperature, water is added, the mixture diluted with more ether, washed with saturated aqueous sodium bicarbonate, water, brine, dried over anhydrous sodium sulfate and stripped in vacuo. The residue is crystallized to give the title compound.

(f) *d* - 3 - methoxy-7α,17α-dimethylestra - 2,5(10),14-trien-17β-ol: To a solution of 1-methoxy-2-propanol (65 ml.) in distilled liquid ammonia (1,000 ml.) is added a solution of *d*-3-methoxy-7α,17α-dimethylestra - 1,3,5(10), 14-tetraen-17β-ol (3.00 g.) in tetrahydrofuran (160 ml.) over 5 minutes. To the clear solution is added lithium ribbon (1.50 g.) in small pieces as rapidly as possible. After stirring for 30 minutes, excess ammonium chloride is added. Water is added and the mixture washed with saturated aqueous sodium bicarbonate, water, brine, dried over hydrous sodium sulfate and stripped in vacuo giving a gum. Crystallization affords the title compound.

(g) *d* - 17β - hydroxy-7α,17α-dimethylestra-5(10),14-dien-3-one: To a solution of oxalic acid (0.50 g.) in methanol (180 ml.) and water (24 ml.) is added *d*-3-methoxy - 7α,17α - dimethylestra-2,5(10),14-trien-17β-ol (2.30 g.). After 10 minutes stirring at room temperature complete solution occurs. After another 50 minutes ether is added, the mixture washed with saturated aqueous sodium bicarbonate, water, dried over anhydrous sodium sulfate and stripped in vacuo giving a gum. Crystallization affords the title product.

EXAMPLE 3

The process of Example 2 is repeated, substituting for the *d* - 3 - methoxy - 7α - methylestra-1,3,5(10)-trien-17- one, cyclic ketal, stiochiometrical amounts of the following compounds:

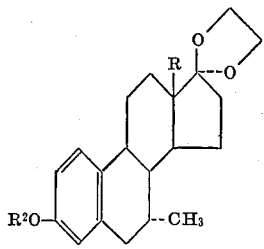

| R | R² |
|---|---|
| $CH_3$ | $CH_3CH_2$ |
| $CH_3$ | $CH_3(CH_2)_4CH_2$ |
| $CH_3CH_2$ | $CH_3$ |
| $CH_3CH_2CH_2$ | $CH_3$ |
| $(CH_3)_2CH$ | $CH_3$ |
| $CH_3(CH_2)_2CH_2$ | $CH_3$ |
| $CH_3(CH_2)_4CH_2$ | $CH_3$ |

The following 17β - hydroxy - 7α,13β,17α - trialkylgona-5(10)-14-dien-3-ones are obtained:

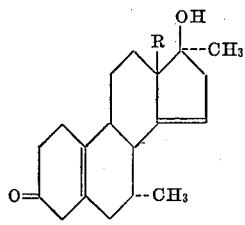

R $CH_3$
$CH_3CH_2$
$CH_3CH_2CH_2$
$(CH_3)_2CH$
$CH_3(CH_2)_2CH_2$
$CH_3(CH_2)_4CH_2$

EXAMPLE 4

13β-ethyl-17β-hydroxy-17α-methylgona-4,6,14-trien-3-one (a) dl - 13β - ethyl - 3 - methoxygona - 1,3,5,(10)-triene-17-one, ethylene ketal: A solution of dl-13-ethyl-3-methoxy-1,3,5(10)-gonatriene-17-one (40.0 g.) in toluene (1300 ml.) and ethylene glycol (100 ml.) containing p-toluenesulfonic acid monohydrate (1.00 g.) is refluxed using a Dean-Stark water separator for 22 hours. After cooling to about 23° C. the mixture is washed with saturated aqueous sodium bicarbonate, water, dried over anhydrous sodium sulfate and stripped in vacuo. The solid residue is recrystallized from methanol giving 34.0 g. of colorless product; M.P. 89–92° C.;

$\lambda^{KBr}_{max.}$ no carbonyl (b) dl-16ξ-bromo-13β-ethyl - 3 - methoxygona - 1,3,5(10)-trien-17-one, cyclic ethylene ketal: To a solution of dl-13-ethyl-3-methoxy-1,3,5(10)-gonatrien - 17 - one, ethylene ketal (5.00 g.) in tetrahydrofuran (400 ml.) is added all at once pyridinium bromide perbromide (6.00 g.) at about 23° C. After stirring at room temperature for 2½ hours, the mixture is diluted with ether, washed with saturated aqueous sodium bicarbonate, water, dried over anhydrous sodium sulfate and stripped in vacuo. The solid residue is recrystallized from methanol giving 4.39 g. of colorless product; M.P. 145–149° C.;

$\lambda^{KBr}_{max.}$ no carbonyl, and strong ketal.

(c) dl - 13β - ethyl - 3 - methoxygona-1,3,5(10),15-tetraen -17-one, cyclic ethylene ketal: A solution of the product of step (b) (0.50 g.) in dimethylsulfoxide (10 ml., distilled in vacuo from triphenylmethyl anion) containing potassium t-butoxide (1.12 g.) is stirred at room temperature for 2½ hours. The mixture is poured into ice-water extracted with ether and the ether extracts washed with saturated aqueous sodium bicarbonate, water, dried over anhydrous sodium sulfate and stripped in vacuo. The resulting gum is rapidly chromatographed on Grade III Woelm neutral alumina using pure hexane as eluent. Trituration with hexane affords 60 mg. of colorless product; M.P. 78–80° C.

$\lambda^{KBr}_{max.}$ 6.23, 6.63 and no carbonyl absorption. A second crop (100 mg.; M.P. 75–78° C.) is also collected.

NMR has 15H centered at 5.72 p.p.m. (pair of doublets, J 15H, 16H 6 cps., J 15H, 14H 3 cps.), 16H centered at 6.25 p.p.m. (pair of doublets, J 16H, 15H 6 cps., J 16H, 14H 1.5 cps.), ethylene ketal $H_4$ centered at 3.94 p.p.m. (multiplet).

(d) dl - 13β - ethyl - 3 - methoxygona - 1,3,5(10),14-tetraen - 17 - one, cyclic ethylene ketal: A solution of p-toluenesulfonic acid (12 mg.) in benzene (25 ml.) is partially distilled to remove traces of water (ca. 5 ml. of distillate). The solution is cooled to room temperature and the product of step (c) (0.20 g.) is added. After stirring 45 minutes at room temperature the solution is poured into saturated aqueous sodium bicarbonate. Ether is added, the organic layer separated, washed with water, dried over anhydrous sodium sulfate and stripped in vacuo giving a crystalline solid; M.P. 72–74° C. NMR has C–15 proton centered at 5.32 p.p.m. (multiplet), dioxolane protons at 3.83 p.p.m. (singlet), and $C_{16}$ protons at 2.40 p.p.m. (multiplet).

(e) dl - 13β - ethyl - 3 - methoxygona - 1,3,5(10),14-tetraen-17-one: To a solution of the product of step (d) (47.0 g.) in acetone (1,500 ml.), is added oxalic acid dihydrate (1.80 g.) and glyoxal (40% in water, 1,100 ml.). The mixture is stirred at about 23° C. for 18 hours, diluted with ether, washed with saturated aqueous sodium bicarbonate, water, dried over anhydrous sodium sulfate and stripped in vacuo. The reuslting gum is crystallized from methanol giving 33.0 g. of the title compound, M.P. 78–82° C.;

$\lambda^{KBr}_{max.}$ 5.78μ

NMR has $C_{15}$ proton at 5.72 p.p.m., $C_{16}$ protons at 2.87 p.p.m., and no dioxolane peak.

(f) dl - 13β - ethyl - 3 - methoxy-17α-methylgona-1,3,5(10),14-tetraen-17β-ol: To a mixture of methyl lithium (10 ml., 1.62 M) in ether (100 ml.) at about 23° C. under nitrogen is added the product of step (e) (0.50 g.) in ether (50 ml.) over 30 minutes with stirring. After stirring another 60 minutes at about 23° C. water is added, the mixture is diluted with more ether, washed with saturated aqueous sodium bicarbonate, water, brine, dried over anhydrous sodium sulfate and stripped in vacuo. The gummy residue is chromatographed on Grade III Woelm neutral alumina and eluted with hexane/benzene giving the starting material (350 mg.) and title compound (80 mg.). Crystallization of the product from methanol affords 70 mg. of colorless product; M.P. 76–82° C.;

$\lambda^{KBr}_{max.}$ 3.04 no carbonyl absorption (g) dl - 13β - ethyl - 3 - methoxy - 17α - methylgona-2,5(10),14-trien-17β-ol: To a solution of 1-methoxy-2-propanol (65 ml.) in distilled liquid ammonia (1,000 ml.) is added a solution of the product of step (f) (3.00 g.) in tetrahydrofuran (160 ml.) over 5 minutes. To the clear solution is added lithium ribbon (1.50 g.) in small pieces as rapidly as possible. After stirring for 30 minutes, excess ammonium chloride is added. Water is added and the mixture washed with saturated aqueous sodium bicarbonate, water, dried over anhydrous sodium sulfate and stripped in vacuo giving a gum. Crystallization from methanol gives 2.32 g. of colorless product; M.P. 109–111° C.;

$\lambda_{max}^{KBr}$ 5.91, 6.01μ

(h) dl - 13β - ethyl - 3 - methoxy - 17α - methylgona-3,5,14-trien-17β-ol: A mixture of dl-13-ethyl-3-methoxy-17α-ethylgona-2,5(10),14-trien-17β-ol (10 g.) oxalic acid dihydrate (100 mg.) and phenol (15 g.) is allowed to stand at about 23° C. for 30 minutes. Ether is added, the mixture washed with dilute aqueous sodium hydroxide, saturated aqueous sodium bicarbonate, brine, dried over anhydrous sodium sulfate and stripped in vacuo. The residue is crystallized to give the title compound.

(i) dl - 13β - ethyl - 17β - hydroxy - 17α - methylgona-4,6,14-trien-3-one: To a solution of dl-13-ethyl-3-methoxy-17α-methylgona-3,5,14-trien-17β-ol (1.0 g.) in acetone (106 ml.), water (27.2 ml.) and acetic acid (2.72 ml.) containing pyridine (0.6 ml.) and sodium acetate (2.72 g.) is added N-bromosuccinimide (0.5 g.) at 0° C. The mixture is stirred at 0° C., for 3 hr., poured into ice-cold brine and the mixture extracted with ether. After washing with water the mixture is dried over anhydrous sodium sulfate and stripped in vacuo below 15° C. Calcium carbonate (3.0 g.) and dimethylformamide (70 ml.) are added and the suspension refluxed for 1 hour. The cooled mixture is filtered, the filtrate diluted with ether, washed with brine, dried over anhydrous sodium sulfate and stripped in vacuo. The residue is recrystallized to give the title compound.

EXAMPLE 5

The process of Example 4 is repeated, substituting for d-17β-hydroxy-7α,17α-dimethylestra-4,14-dien-3-one one, stoichiometrical amounts of the following:

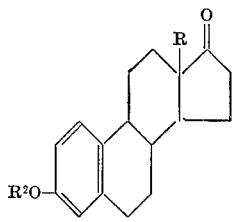

| R | R² |
|---|---|
| CH₃ | CH₃ |
| CH₃CH₂ | CH₃(CH₂)₄CH₂ |
| CH₃CH₂CH₂ | CH₃ |
| (CH₃)₂CH | CH₃ |
| CH₃(CH₂)₂CH₂ | CH₃ |
| CH₃(CH₂)₄CH₂ | CH₃ |

There are obtained the following 13β,17α-dialkyl-17β-hydroxygona-4,6,14-trien-3-ones:

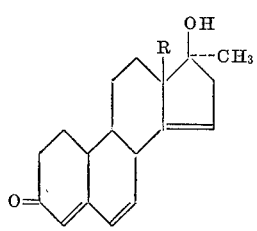

R
CH₃
CH₃CH₂
CH₃CH₂CH₂
(CH₃)₂CH
CH₃(CH₂)₂CH₂
CH₃(CH₂)₄CH₂

EXAMPLE 6 d-17β-hydroxy-7α,17α-dimethylestra-4,14-dien-3-one

A solution of d - 17β - hydroxy-7α,17α-dimethylestra-5(10),14-dien-3-one (1.30 g.) in methanol (100 ml.) containing potassium hydroxide (0.50 g.) is stirred at room temperature under nitrogen for 5 minutes. The solution is poured into saturated aqueous sodium bicarbonate, extracted with ether, and the ether extracts washed with water, dried over anhydrous sodium sulfate and stripped in vacuo giving a gum which can not be crystallized. The gum is columned on 200 g. of Grade III Woelm neutral alumina using benzene/hexane as eluent and gradually increasing the proportion of benzene. Crystallization then affords the title product.

EXAMPLE 7

The procedure of Example 6 is repeated, substituting for the d-17β-hydroxy-7α,17α-dimethylestra-5(10),14-dien-3-one, stoichiometrical amounts of the corresponding compounds of Example 3. There are obtained the following compounds:

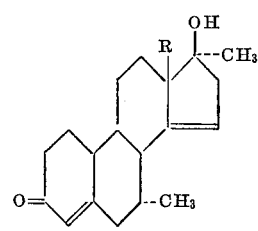

R
CH₃CH₂
CH₃CH₂CH₂
(CH₃)₂CH
CH₃(CH₂)₂CH₂
CH₃(CH₂)₄CH₂

EXAMPLE 8

13β-ethyl-17β-hydroxy-7α,17α-dimethylgona-4,14-dien-3-one

To a mixture of methyl magnesium bromide (3 M in ether, 16.0 ml.), and freshly prepared cuprous chloride (0.3 g.) in tetrahydrofuran (80 ml.) under nitrogen at 0° C. is added over 15 minutes with vigorous stirring a solution of dl - 13 - ethyl-17β-hydrroxy-17α-methylgona-4,6,14-trien-3-one (2.0 g.) in tetrahydrofuran (40 ml.). Stirring is continued at room temperature for another 30 minutes. The mixture is poured into a mixture of ice-brine-hydrochloric acid. The product is then extracted with ether, the extracts wshed with saturated aqueous sodium bicarbonate, brine, dried over anhydrous sodium sulfate and stripped in vacuo. The residue is crystallized to give the title product.

EXAMPLE 9

The procedure of Example 8 is repeated, substituting for the dl - 13β - ethyl - 17β - hydroxy - 17α - methylgona-4,6,14-trien-3-one, stoichiometrical amounts of the corresponding compounds of Example 6. There are obtained the following compounds:

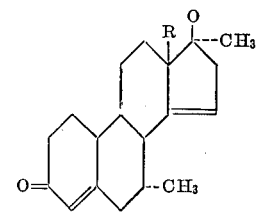

R
CH₃
CH₃CH₂CH₂
(CH₃)₂CH
CH₃(CH₂)₂CH₂
CH₃(CH₂)₄CH₂

EXAMPLE 10 dl-13-ethyl-17β-hydroxy-17α-methylgona-4,14-dien-3-one (a) *dl*-13-ethyl-17β-hydroxy-17α-methylgona - 5(10), 14-dien-3-one. To a solution of oxalic acid (0.50 g.) in methanol (180 ml.) and water (24 ml.) is added *dl*-13-ethyl-3-methoxy-17α-methylgona-2,5(10),14 - trien - 17β-ol (2.30 g.). After 10 minutes stirring at about 23° C. complete solution occurs. After another 50 minutes ether is added, the mixture washed with saturated aqueous sodium bicarbonate, water, dried over anhydrous sodium sulfate and stripped in vacuo giving a gum. Crystallization from ether gives 1.31 g. of colorless product; M.P. 117–121° C.;

$\lambda_{max.}^{KBr}$ 2.97, 5.88μ

(b) *dl*-13-ethyl-17β-hydroxy - 17α - methylgona - 4,14-dien-3-one: A solution of *dl*-13-ethyl-17β-hydroxy-17α-methylgona-5(10),14-dien-3-one (1.30 g.) in methanol (100 ml.) containing potassium hydroxide (0.50 g.) is stirred at room temperature under nitrogen for 5 minutes. The solution is poured into saturated aqueous sodium bicarbonate, extracted with ether, and the ether extracts washed with water, dried over anhydrous sodium sulfate and stripped in vacuo giving a gum which can not be crystallized. The gum is columned on 200 g. of Grade III Woelm neutral alumina using 40/60 benzene/hexane as eluent and gradually increasing the proportion of benzene. Crystallization from ether affords 0.65 g. of colorless product; M.P. 101–104° C.;

$\lambda_{max.}^{KBr}$ 2.99, 6.05, 6.22μ; $\lambda_{max.}^{EtOH}$ 238 mμ (ε 17,200)

NMR has 4 proton at 5.87 p.p.m., 15 proton at 5.23 p.p.m., and 17α-methyl at 1.27 p.p.m.

*Analysis.*—Calc'd for $C_{20}H_{28}O_2$ (percent): C, 79.95; H, 9.39. Found (percent): C, 80.01; H, 9.15.

EXAMPLE 11

13-ethyl-17β-hydroxygona-4,14-dien-3-one (a) *dl*-13-ethyl-17β-hydroxy-3-methoxygona-1,3,5(10), 14-tetraene: To a slurry of lithium aluminum hydride (4.0 g.) in dry ether (100 ml.) is added with stirring over 10 minutes at room temperature, *dl*-13-ethyl-3-methoxygona-1,3,5(10)-trien-17-one (4.0 g.) dissolved in ether (100 ml.). Stirring is continued for one hour at about 23° C. Then are added, in succession, water (4.0 ml. in 15 ml. dioxane), NaOH (15%, 4.0 ml.) and water (12.0 ml.) dropwise with vigorous stirring. The solids are filtered, washed with ether and the combined filtrate and washings are washed with saturated aqueous sodium bicarbonate, water, dried over anhydrous sodium sulfate and stripped in vacuo to give a colorless gum which crystallizes on standing at 0° C.; 3.70 g.;

$\lambda_{max.}^{KBr}$ 3.05 and no carbonyl absorption;

NMR on sample prepared previously has $C_{15}$ proton at 5.32 p.p.m., 17 proton triplet centered at 4.19 p.p.m. and 13-methyl proton triplet centered at 0.86 p.p.m.

(b) *dl*-13-ethyl-17β-hydroxy-3-methoxygona - 2,5(10), 14-triene. A solution of *dl* - 13 - ethyl - 17β - hydroxy-3-methoxygona-1,3,5(10),14-tetraene (3.00 g.) in distilled tetrahydrofuran (100 ml.) is added over 10 minutes to distilled liquid ammonia (500 ml.) with stirring. To the clear solution is added lithium ribbon (3.00 g.) in small pieces as rapidly as possible with vigorous stirring. Stirring is continued for 2 hours and excess absolute ethanol is added dropwise to discharge the blue color. Water is added, the mixture extracted with ether and the ether extracts washed with saturated aqueous sodium bicarbonate, water, dried over anhydrous sodium sulfate and stripped in vacuo to afford 3.00 g. of colorless gum;

$\lambda_{max.}^{KBr}$ 3.07, 5.92, 6.02 and no aromatic or carbonyl absorption;

(c) *dl*-13-ethyl-17β-hydroxygona-4,14-dien - 3 - one: A solution of *dl*-13-ethyl-17β-hydroxy - 3 - methoxygona-2,5(10),14-triene (3.0 g.) in a mixture of methanol (54.0 ml.), water (2.4 ml.) and concentrated hydrochloric acid (3.6 ml.) is stirred under nitrogen at room temperature for 1 hour. The clear solution is diluted with benzene, washed with saturated aqueous sodium bicarbonate, water, dried over anhydrous sodium sulfate and stripped in vacuo giving a gum. Columning on Grade III Woelm neutral alumina with 100% benzene as eluant and crystallization from ether affords 1.125 g. of colorless product; M.P. 117–120° C.;

$\lambda_{max.}^{KBr}$ 2.97, 6.05, 6.20; $\lambda_{max.}^{EtOH}$ 238 mμ (ε 16,850)

NMR has 4H at 5.87 p.p.m., 15H at 5.27 p.p.m., 17H (triplet, J=9.0) at 4.13 p.p.m. and 17 OH proton at 2.52 p.p.m.

*Analysis.*—Calc'd for $C_{19}H_{26}O_2$ (percent): C, 79.68; H, 9.15. Found (percent): C, 79.61; H, 9.27.

We claim:

1. A compound of the formula:

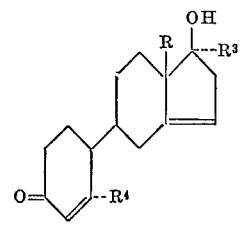

wherein
R is (lower)alkyl; and
$R^3$ and $R^4$ are hydrogen or methyl.

2. A compound as defined in claim 1 which is 13-ethyl-17β-hydroxy-17α-methylgona-4,14-dien-3-one.

3. A compound as defined in claim 1 which is 13-ethyl-17β-hydroxgona-4,14-dien-3-one.

4. A compound as defined in claim 1 of the formula:

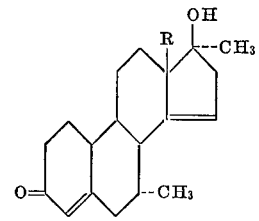

wherein R is (lower)alkyl.

5. A compound as defined in claim 4 which is 17β-hydroxy-7α,17α-dimethylestra-4,14-dien-3-one.

6. A compound as defined in claim 4 which is 13β-ethyl-17β-hydroxy-7α,17α-dimethylgona-4,14-dien-3-one.

7. A compound of the formula:

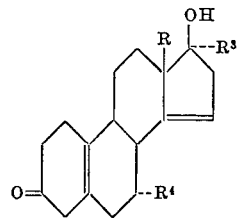

wherein
R is (lower)alkyl; and
$R^3$ and $R^4$ are hydrogen or methyl.

8. A compound as defined in claim 7 which is 13-ethyl-17β-hydroxy-17α-methylgona-5(10),14-dien-3-one.

9. A compound as defined in claim 7 which is 17β-hydroxy-7α,17α-dimethylestra-5(10),14-dien-3-one.

10. A compound of the formula:

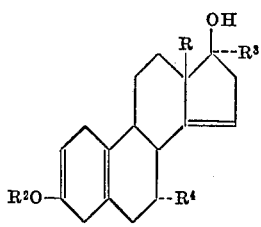

wherein
R and R² are (lower)alkyl; and
R³ and R⁴ are hydrogen or (lower)alkyl.

11. A compound as defined in claim 10 which is 3-methoxy-7α,17α-dimethylestra-2,5(10),14-trien-17β-ol.

12. A compound as defined in claim 10 which is 13-ethyl-17β-hydroxy-3-methoxygona-2,5(10),14-triene.

13. A compound of the formula:

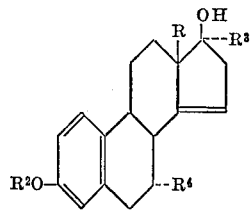

wherein
R and R² are (lower)alkyl, and
R³ and R⁴ are hydrogen or (lower)alkyl.

14. A compound as defined in claim 13 which is 3-methoxy-7α,17α - dimethylestra - 1,3,5(10),14 - tetraen-17β-ol.

15. A compound as defined in claim 13 which is 13-ethyl-17β-hydroxy-3-methoxygona-1,3,5(10),14-tetraene.

16. A compound of the formula:

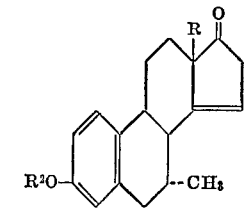

wherein R and R² are (lower)alkyl.

17. A compound as defined in claim 16 which is 3-methoxy-7α-methylestra-1,3,5(10),14-tetraen-17-one.

18. A compound of the formula:

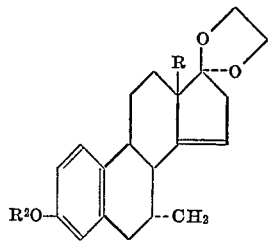

wherein R and R² are (lower)alkyl.

19. A compound as defined in claim 18 which is 3-methoxy-7α-methylestra-1,3,5(10),14 - tetraen - 17 - one, cyclic ethylene ketal.

20. A compound of the formula:

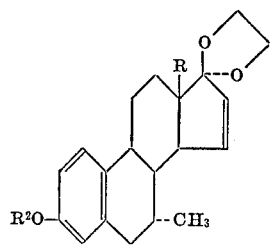

wherein R and R² are (lower)alkyl.

21. A compound as defined in claim 19 which is 3-methoxy-7α-methylestra-1,3,5(10),15 - tetraen - 17 - one, cyclic ethylene ketal.

22. A compound of the formula:

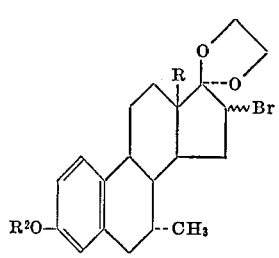

wherein R and R² are (lower)alkyl.

23. A compound as defined in claim 22 which is 16ξ-bromo-3-methoxy-7α-methylestra-1,3,5(10)-trien-17 - one, cyclic ethylene keal.

24. A compound of the formula:

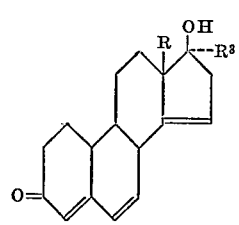

wherein R is (lower)alkyl and R³ is hydrogen or methyl.

25. A compound as defined in claim 24 which is 13β-ethyl-17β-hydroxy-17α-methylgona-4,6,14-trien-3-one.

References Cited
UNITED STATES PATENTS

| | | | |
|---|---|---|---|
| 3,177,206 | 4/1965 | Smith et al. | 260—239.55 |
| 3,189,605 | 6/1965 | Smith et al. | 260—239.55 |
| 3,374,228 | 3/1968 | Fried | 260—239.55 |

HENRY A. FRENCH, Primary Examiner

U.S. Cl. X.R.
260—397.4, 397.5, 999

UNITED STATES PATENT OFFICE
CERTIFICATE OF CORRECTION

Patent No. 3,577,410          Dated   May 4, 1971

Inventor(s) Daniel Teller, Goerge Douglas, and Herchel Smith

It is certified that error appears in the above-identified patent and that said Letters Patent are hereby corrected as shown below:

In Claim 1, the structural formula should appear as follows:

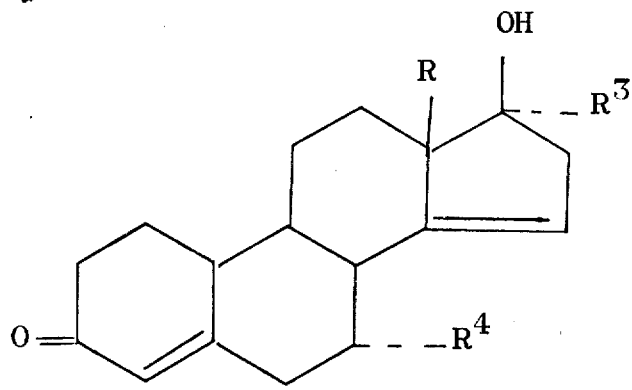

Signed and sealed this 22nd day of May 1973.

(SEAL)
Attest:

EDWARD M. FLETCHER, JR.
Attesting Officer

ROBERT GOTTSCHALK
Commissioner of Patents